(No Model.)
H. D. PERKY.
PERFORATED ROLL MACHINE FOR REDUCING CEREALS FOR FOOD.
No. 532,481. Patented Jan. 15, 1895.
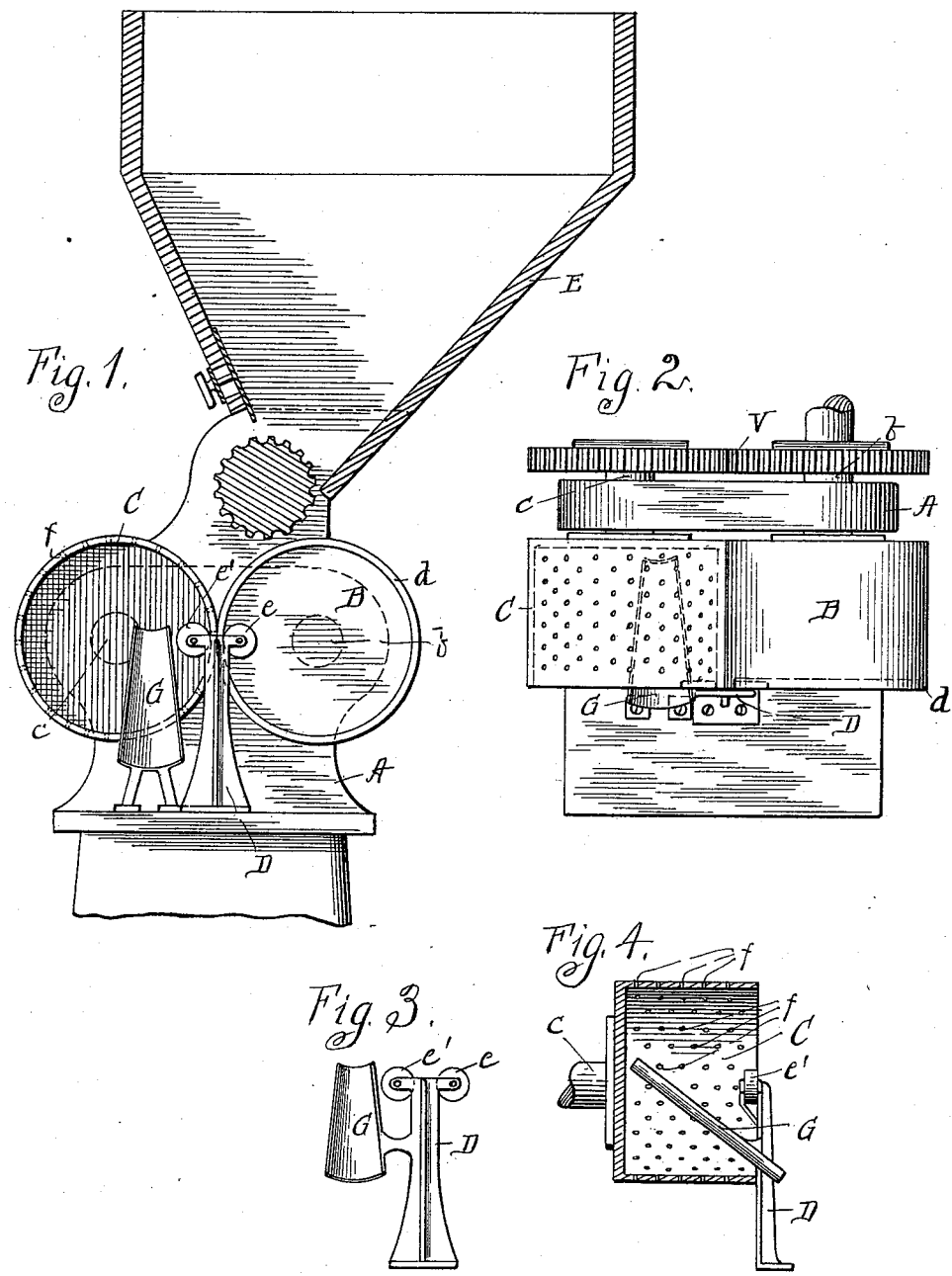
WITNESSES
Geo. M. Anderson
Phille Masi.
INVENTOR
Henry D. Perky
by E. W. Anderson
his Attorney
THE NORRIS PETERS CO., PHOTO-LITHO., WASHINGTON, D. C.

UNITED STATES PATENT OFFICE.

HENRY D. PERKY, OF DENVER, COLORADO, ASSIGNOR TO THE CEREAL MACHINE COMPANY, OF SAME PLACE.

PERFORATED-ROLL MACHINE FOR REDUCING CEREALS FOR FOOD.

SPECIFICATION forming part of Letters Patent No. 532,481, dated January 15, 1895.

Application filed March 31, 1894. Serial No. 505,951. (No model.)

*To all whom it may concern:*

Be it known that I, HENRY D. PERKY, a citizen of the United States, residing at Denver, in the county of Arapahoe and State of Colorado, have invented new and useful Improvements in Perforated-Roll Machines for Reducing Cereals for Food; and I do declare the following to be a full, clear, and exact description of the invention, such as will enable others skilled in the art to which it appertains to make and use the same, reference being had to the accompanying drawings, forming a part of this specification, and to the letters of reference marked thereon.

Figure 1 of the drawings is an end view, partly in section, of a machine embodying the invention. Fig. 2 is a plan view of the same with the hopper removed. Figs. 3 and 4, are detail views showing the discharging scoop in slightly modified form.

The invention has relation to rolling machines for reducing grain to thread like or shred like form, while thoroughly incorporating together the interior and exterior particles of the berry.

In the accompanying drawings, the letter A designates the frame or support, having bearings for the journals of the reducing rolls B, and C, which are designed to work in neat contact with each other.

The roll B is formed preferably of steel, and has a cylindrical surface. Its journal shaft $b$, is strong and is seated in a long bearing in order to brace the roll to its work. The body of this roll is solid, but it may have a circular end flange $d$, this being an extension of the marginal portion of said roll at its free end to engage a small roller $e$, of a tie brace D, which is also provided with a second small roller $e'$, to engage the circular end flange $f$, of the other roll C.

The roll C is of cylindrical form and hollow, and its cylindrical wall is provided with perforations throughout its extent. This hollow roll is open at one end, and at its other end is formed with a strong back portion to which is connected its journal shaft $c$, which is of comparatively large diameter, and is seated in a long bracing bearing.

The rolls are turned by means of gearing, as indicated at V.

E represents a hopper seated on the frame and designed to feed the grain, previously prepared by boiling and drying, to the rolls B, and C, which compress the berries, mashing them, and intimately incorporating the particles composing the outer portions of the berries with the starchy interior part thereof. The action of the rolls forces the grain during this process into and through the perforations of the roll C, the material being protruded within the perforated wall in the form of threads or shreds, growing in length at each revolution of the roll until removed from the cylinder by the operation of a suitable scoop or discharging device G.

Having described this invention, what I claim, and desire to secure by Letters Patent, is—

1. In a machine for reducing grain for food, the combination with a hollow roll having a perforated cylindrical wall, of a cylindrical compressing and crushing roll working in metallic contact therewith, a feeding hopper, and rotating mechanism for said rolls, substantially as specified.

2. In a machine for reducing grain, for food, the combination with a hollow perforated roll, of a cylindrical compressing roll working in contact therewith, the operating gear therefor, and a rolling tie-brace, substantially as specified.

3. In a machine for reducing grain for food, the combination with the hollow perforated roll and the compressing roll working in contact therewith, of the operating gear, the feed hopper, and a discharging device, substantially as specified.

In testimony whereof I affix my signature in the presence of two witnesses.

HENRY D. PERKY.

Witnesses:
J. M. STANLEY,
HARRY C. JAMES.